United States Patent [19]
Snelling et al.

[11] Patent Number: 5,555,258
[45] Date of Patent: Sep. 10, 1996

[54] HOME PERSONAL COMMUNICATION SYSTEM

[75] Inventors: Richard K. Snelling, Alpharetta, Ga.; P. Stuckey McIntosh, 59 E. Park La., Atlanta, Ga. 30309; Mark Tucker, Norcross, Ga.

[73] Assignee: P. Stuckey McIntosh, Atlanta, Ga.

[21] Appl. No.: 262,214

[22] Filed: Jun. 17, 1994

[51] Int. Cl.⁶ ................................................ H04B 1/56
[52] U.S. Cl. ............................. 370/29; 370/93; 379/57; 379/59; 379/90; 379/98
[58] Field of Search ............................ 370/29, 95.1, 93; 379/57, 58, 59, 63, 90, 98; 455/33.1, 70

[56] References Cited

U.S. PATENT DOCUMENTS

| | | | |
|---|---|---|---|
| 3,949,172 | 4/1976 | Brown et al. | 179/2.5 R |
| 4,058,678 | 11/1977 | Dunn et al. | 179/2.5 R |
| 4,475,193 | 10/1984 | Brown | 370/124 |
| 4,479,033 | 10/1984 | Brown et al. | 179/2.51 |
| 4,514,594 | 4/1985 | Brown et al. | 179/2.51 |
| 4,523,307 | 6/1985 | Brown et al. | 370/30 |
| 4,658,096 | 4/1987 | West, Jr. et al. | 379/59 |
| 4,675,863 | 6/1987 | Paneth et al. | 370/50 |
| 4,737,975 | 4/1988 | Shafer | 379/58 |
| 4,775,997 | 10/1988 | West, Jr. et al. | 379/58 |
| 4,776,001 | 10/1988 | Murata | 379/62 |

(List continued on next page.)

FOREIGN PATENT DOCUMENTS

| | | | |
|---|---|---|---|
| 2053776 | 4/1993 | Canada | H04M 1/00 |
| 1-016051 | 1/1989 | Japan | H04M 1/00 |
| 1-057860 | 3/1989 | Japan | H04M 3/42 |
| 1-309530 | 12/1989 | Japan | H04B 7/26 |
| 1-309531 | 12/1989 | Japan | H04B 7/26 |
| 2-034046 | 2/1990 | Japan | H04B 7/26 |
| 2-034047 | 2/1990 | Japan | H04B 7/26 |
| 2-063352 | 3/1990 | Japan | H04M 1/00 |
| 3-179957 | 8/1991 | Japan | H04M 1/00 |
| 5-153043 | 6/1993 | Japan | H04B 7/26 |

OTHER PUBLICATIONS

Anon, "The Cordless Office", *Telecom World*, Dec. 1991, pp. 36–37.

Bud, A., "Technologies for Personal Networking in Europe", *International Mobile Communications 90*, Jun. 12–14, 1990, pp. 79–88.

(List continued on next page.)

*Primary Examiner*—Wellington Chin
*Assistant Examiner*—Shick Hom
*Attorney, Agent, or Firm*—Pollock, Vande Sande & Priddy

[57] ABSTRACT

A wireless telephone subsystem for coupling line type telephony equipment to the public switched telephone network is described. A base unit is provided which is adapted to be coupled to a plurality of lines of the PSTN. The base unit includes a base coder/decoder which transforms analog signals received from the lines of the PSTN to digital signals and conversely transforms digital signals to analog signals for coupling to the lines of the PSTN. The base unit includes a multiple channel transceiver coupled to the base coder/decoder which responds to the digital signals provided by the base coder/decoder for transmitting those signals by placing selected portions of the digital signals into selected portions of a multiplex frame. The base multiple channel transceiver also receives digital signals and couples those digital signals to the base coder/decoder. Programmable switching means is provided to associate selected of the PSTN lines and selected portions of the multiplex frame. The subsystem also includes a wireless interface unit for connecting to the line type telephony equipment. The wireless interface unit also includes a remote coder/decoder for transforming analog signals received from the line type telephony equipment into digital signals and for transforming other digital signals into analog signals for coupling to the line type telephony equipment. The wireless interface also includes a remote transceiver which is coupled to the remote coder/decoder. The remote transceiver responds to digital signals from the remote coder/decoder for transmitting the signals into selected portions of the multiplex frame and receives other digital signals and couples those to the remote coder/decoder.

37 Claims, 11 Drawing Sheets

U.S. PATENT DOCUMENTS

| | | | |
|---|---|---|---|
| 4,779,262 | 10/1988 | Avis et al. | 370/50 |
| 4,792,946 | 12/1988 | Mayo | 370/86 |
| 4,817,089 | 3/1989 | Paneth et al. | 370/95 |
| 4,825,448 | 4/1989 | Critchlow et al. | 375/8 |
| 4,893,317 | 1/1990 | Critchlow et al. | 375/97 |
| 4,912,705 | 3/1990 | Paneth et al. | 370/95.1 |
| 4,922,517 | 5/1990 | West, Jr. et al. | 379/58 |
| 4,994,802 | 2/1991 | Critchlow et al. | 341/122 |
| 5,008,900 | 4/1991 | Critchlow et al. | 375/8 |
| 5,022,024 | 6/1991 | Paneth et al. | 370/50 |
| 5,072,308 | 12/1991 | Lin et al. | 358/426 |
| 5,101,418 | 3/1992 | Critchlow et al. | 375/38 |
| 5,119,375 | 6/1992 | Paneth et al. | 370/95.1 |
| 5,121,391 | 6/1992 | Paneth et al. | 370/95.1 |
| 5,146,473 | 9/1992 | Critchlow et al. | 375/8 |
| 5,159,705 | 10/1992 | Critchlow et al. | 455/76 |
| 5,168,507 | 12/1992 | Critchlow et al. | 375/13 |
| 5,177,741 | 1/1993 | Critchlow et al. | 370/110.4 |
| 5,212,830 | 5/1993 | Miller | 455/33.1 |
| 5,224,120 | 6/1993 | Schilling | 375/1 |
| 5,228,053 | 7/1993 | Miller et al. | 375/1 |
| 5,228,056 | 7/1993 | Schilling | 375/1 |
| 5,260,967 | 11/1993 | Schilling | 375/1 |
| 5,263,045 | 11/1993 | Schilling | 375/1 |
| 5,274,665 | 12/1993 | Schilling | 375/1 |
| 5,276,703 | 1/1994 | Budin et al. | 370/93 |
| 5,289,497 | 2/1994 | Jacobson et al. | 375/1 |
| 5,299,226 | 3/1994 | Schilling | 375/1 |
| 5,307,399 | 4/1994 | Dai et al. | 379/57 |
| 5,361,294 | 11/1994 | Lee et al. | 370/29 |
| 5,384,826 | 1/1995 | Amitay | 379/59 |

OTHER PUBLICATIONS

Costello, J., "Look—No Wires", *Office Equipment News*, Nov. 1992, pp. 46–47.

Douligeris, C., "Intelligent Home Systems", *IEEE Communications Magazine*, Oct. 1993, pp. 52–61.

Duet, D. A., "An Investigation into the Economic Impact of Low–Powered, Digital Radio in the Telephone Distribution Plant", *Globecom '89*, Nov. 27–30, 1989, pp. 38.7.1.–5.

Duet, D. A., "Portable Phone Service for an Upscale Subdivision—An Economic Assessment", *ICC '90. IEEE GA*, Apr. 16–19, 1990, pp. 206.1.1–4.

Elliott, P. W., and T. N. Kanaropoulos, "Supporting Diverse Services in a Microcellular TDMA System", *Tenth UK Teletraffic Symposium: Performance Engineering in Telecommunications Networks*, Martlescham Heath, U.K., Apr. 14–16, 1993, pp. 28/1–9.

Habuka, T., and H. Sekiguchi, "Standardization of Personal Handy Phone (PHP)", *NTT Review*, vol. 5, No. 5, Sep. 1993, pp. 101–105.

Kobb, B. Z., "Personal Wireless", *IEEE Spectrum*, Jun. 1993, pp. 20–25.

Madrid, J., S. Sheldon, and G. Cheadle, "A New 'Galaxy' on the Horizon: Wireless Telephony", *TE&M*, Jul. 15, 1990, pp. 49–52.

Mulder, R. J., "Radio Access in Corporate Technology Networks", *2nd International conference on Private Switching Systems and Networks*. London, Jun. 23–25, 1992, pp. 110–116.

Polimene, F., "Use your Telephones as a Home Intercom System", *Radio–Electronics*, May 1991, pp. 44–48.

Spicer, J. J., G. A. Halls, and G. Crisp, "Wireless Office Data Communications using CT2 and DECT", *IEE Colloquim on 'Personal Communications, Circuits, Systems and Technology'* Digest No. 12, London, Jan. 22, 1993, pp. 9/1–4.

van der Hoek, H., "From Cordless PABX to PCN", *Telecommunications* (International Edition), Mar. 1991, pp. 49–52.

Werbus, V., A. Veloso, and A. Villanueva, "DECT—Cordless Functionality in New Generation Alcatel PABXs", *Electrical Communication*, 2nd Quarter 1993, pp. 172–180.

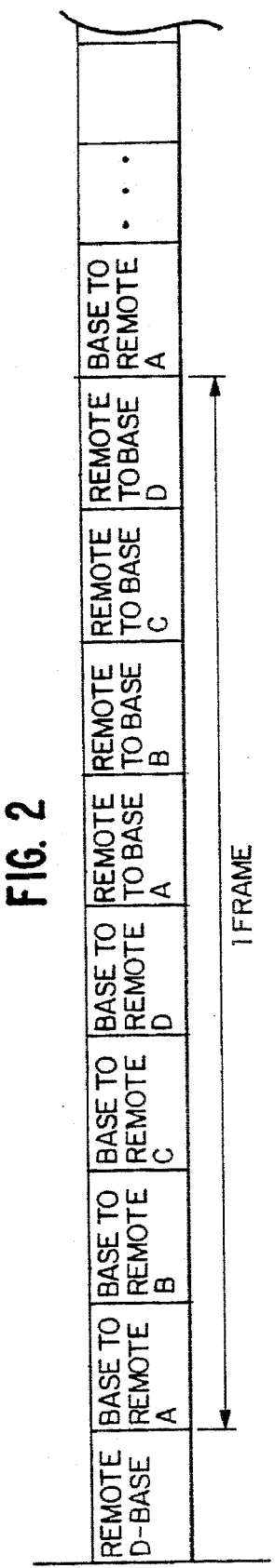
FIG. 2
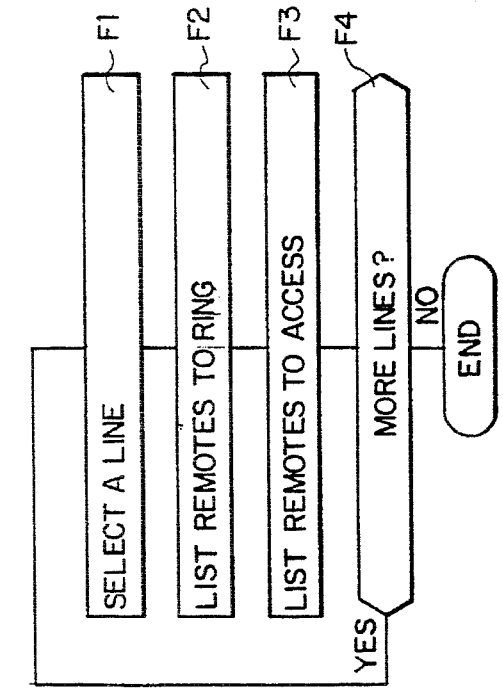
FIG. 11A
FIG. 11B

HOME PERSONAL COMMUNICATION SYSTEM

BACKGROUND OF THE INVENTION

The use of radio frequency media for telephony became widely available in the last 15 years. The major application lies in areas where there is no substitute for the use of RF media, such as in mobile telephony.

However, even before mobile telephony became popular, there was a need for providing connectivity in the residential market. This need is much older than the use of the popular mobile telephony and presently exists along side the limited current use of radio frequency media for telephony.

More particularly, it has been many years since the typical consumer believed that a single telephone was sufficient. The perceived requirement for multiple telephones carried with it the need for connecting multiple telephones to the telephone network. The telephone network provides one or more telephone lines (or C.O. lines) to the location which is serviced, e.g. residences, businesses, etc. In order to support a telephone instrument, connectivity is required between the instrument and the termination of the C.O. line. In order to support multiple telephone instruments or other line type telephone devices, connectivity is required between each of the instruments or devices and the C.O. line termination. It is true that a small fraction of the need has been alleviated by the use of the "cordless" telephone. The "cordless" telephone consists of a base unit which must be hardwired to the telephone network and a "portable" hand-held unit. The "portable" hand-held unit is coupled to the base unit through RF media. However, the "cordless" telephone does not alleviate the major requirement for connectivity throughout a residence for several reasons. In the a first place, the residential user desiring multiple telephones cannot substitute the "cordless" telephone since there is only 1 "portable" handset per base unit. In addition, the quality of the RF link between the "portable" handset and the base unit is limited to voice application. Other applications which, today, are as important as voice include facsimile and modem traffic, neither of which can be accommodated on the RF link of a "cordless" telephone.

In general, the connectivity requirement can only be met by a system which is capable of handling a multiline application and which can be used to transmit/receive voice traffic, facsimile or modem traffic from any location in the residence. In other words, what is desirable is a wireless, in-house telephone system designed to provide multi-line phone operations, allowing the consumer to set up a multiple phone, multiple line system without having to use wired phone connections running throughout the building. Such a multi-line system allows any number of incoming phone lines to be routed to various phones, including wire line type phones, or phone-related devices, such as fax machines, modems, etc., regardless of where they are located, by using a wireless RF medium.

SUMMARY OF THE INVENTION

The invention meets the needs outlined above. In a preferred embodiment, the implementation includes a base unit and one or more handset units with associated charging cradles, as well as one or more Wireless Subscriber Loop Interface (WSLI) units providing connectivity to fax machines, modems, conventional telephones, etc. The base unit is placed in a fixed location, preferably inside the residence, and is connected to the phone lines entering the residence from the local Central Office. The base unit provides functionality to convert incoming analog signals to a digital format and for transmitting the digital information by radio link to the various handsets and WSLIs, regardless of their location within the building or directly adjacent the exterior of the building. The base unit then acts as an interface between the incoming phone lines and the user handset and/or WSLIs. The base unit can be user-configured to provide a wide variety of switching configurations between the incoming lines and the handsets and WSLIs. The base unit, for example, could be configured so as to associate or dedicate each of the different handsets or WSLIs to one of the phone lines. Alternatively, several handsets, WSLIs, or a combination of handsets and WSLIs could be associated with a single phone line. As still a further alternative, several handsets, several WSLIs, or combinations of handsets and WSLIs could be associated with multiple phone lines. By proper user configuring of the base unit, any handset or any WSLI could access any phone line and, likewise, any handset or WSLI could communicate to any other handset or any other WSLI.

The base unit is modular in nature and includes a conventional connection point (such as an RJ-11 jack) for connection to each of the multiple C.O. lines, and an isolation transformer and a 2/4 wire hybrid. The 2/4 wire hybrid is, in turn, connected to a codec. The codec accepts analog signals from the hybrid and converts them at an output port to digital signals and, conversely, accepts digital signals at the same port, converts the received digital signals to analog signals, which are then coupled back to the hybrid. The base unit includes an isolation transformer, hybrid and codec for each C.O. telephone line. In addition, the base unit includes a switching/processing unit with a port for each codec in the base unit and an interface to the last component of the base unit which is a radio transceiver. The switching/processing unit also includes a microprocessor for providing control functions to the switching/processing unit and a user interface to allow the user to configure the base unit. The switching/processing unit interface to the transceiver includes 5 paths. The 5 paths include a transmit data path and a transmit clock path (from switching/processing unit to transceiver), a receive data and receive clock path (from transceiver to switching/processing unit) and a radio control path (from switching/processing unit to transceiver). The transceiver implements a Time Division Multiple Access with Time Division Duplex (TDMA/TDD) operation. In one specific example of an application of the invention, for interfacing 4 C.O. lines, the TDMA/TDD transceiver generates a TDMA frame carrying 8 slots. Four of the slots are used in the forward direction, i.e. for transmitting information from base to remote, and 4 other slots are used in the reverse direction, i.e. for transmissions from remote to base.

Each slot provides a 64 Kbps voice channel or equivalent plus supervisory data of about 10 Kbps.

Each of the remote units, that is the handsets and the WSLIs, includes a transceiver, a processor unit and a codec. The processor unit includes a user interface to perform at least the dialing function to change state from on-hook to off-hook, and vice versa and in some cases some configuration control. The codec in the handset has a pair of transmit terminals which are coupled to a microphone and a pair of receive terminals coupled to a speaker. On the other hand, codec of the WSLI is coupled in turn to a hybrid which, in turn, is coupled via an isolation transformer to a conventional telephony connection device such as an RJ-11 jack.

A multiplex frame generated by the base unit transceiver can be considered to carry n bidirectional channels; in a preferred embodiment n=4 (although it should be apparent that the number of channels can be increased or decreased without departing from the invention). Assuming that each remote is assigned a channel (as will be seen, this is not essential to practicing the invention), then the user configuration of the base unit could for example associate exclusively a different channel of the frame with a different central office telephone line. In this fashion, the RF media provides in effect for a unique and dedicated connection from a central office line to one of the remotes.

However, by modifying the user-programmable configuration, the remotes could be assigned the first free channel. Assuming the channels are still dedicated to a given central office line, then any remote can select the first free central office line rather than a particular central office line.

Moreover, there is no reason why a central office line is limited to connection to a single remote. Rather, a single central office line could be connected to plural remotes, one acting as an extension of the other. Likewise, there is no reason to limit a remote to a connection with a single central office line, rather it could be conferenced to two or more central office lines.

In general the user can first assign none, one or more dedicated C.O. lines to a particular remote or remotes. The remaining C.O. lines can thereafter be used on a first come first served basis by all or less than all of the remotes. The RF media (i.e., the multiplex frame) provides the link or connectivity between the C.O. terminations in the base unit and the remotes as a group. Of course there is no reason any particular remote need be connected to a C.O. line, rather one remote can use the RF media to connect to another remote. It is even conceivable to use the base unit to connect one C.O. line to another, i.e., a conference connection with one or more remotes.

More particularly, assume that the user has a facsimile machine and will use a dedicated line for this application. The configuration would then dedicate the particular remote serving the facsimile machine to the designated facsimile C.O. line. All other remotes, whether of the handset or WSLI type could share the remaining C.O. lines. Alternatively, one or another C.O. line could be dedicated to a handset or WSLI, as a private line application.

Accordingly, the invention provides a wireless telephone subsystem for coupling line type telephony equipment to the public switched telephone network comprising:

a base unit adapted to be coupled to a plurality of lines of the public switched telephone network, said base unit including:
base coder/decoder means for transforming analog signals received from said lines of said public switched telephone network the first digital signals and for transforming other digital signals to analog signals-for coupling to said lines of said public switched telephone network;
a base multiple channel TDD/TDMA RF transceiver coupled to said base coder/decoder means, said base multiple channel TDD/TDMA RF transceiver responsive to said first digital signals for transmitting said signals by placing selected portions of said first digital signals into selected portions of a multiplexed frame, and for receiving other digital signals for coupling said other digital signals to said base coder/decoder means; and
programmable switching means for associating selected of said public switched telephone network lines and selected portions of said multiplex frame;
at least one wireless interface unit comprising:
coupling means for connecting to line type telephony equipment;
remote coder/decoder means for transforming analog signals received from said line type telephony equipment to third digital signals and for transforming other digital signals to analog signals for coupling to said line type telephony equipment;
a remote TDD/TDMA RF transceiver coupled to said remote coder/decoder means;
whereby said base unit provides connectivity between a line of said public switched telephone network and said at least one wireless interface unit.

BRIEF DESCRIPTION OF THE DRAWINGS

The present invention will be described in further detail in the following portions of this specification when taken in conjunction with the attached drawings in which:

FIG. 2 is representative of a TDMA frame showing a frame having 8 slots supporting 4 bidirectional channels;

FIG. 11A is a flow diagram illustrating a typical configuration sequence and FIG. 11B represents a resulting configuration table resulting from the configuration sequence.

DETAILED DESCRIPTION OF A PREFERRED EMBODIMENT

Figure 1:
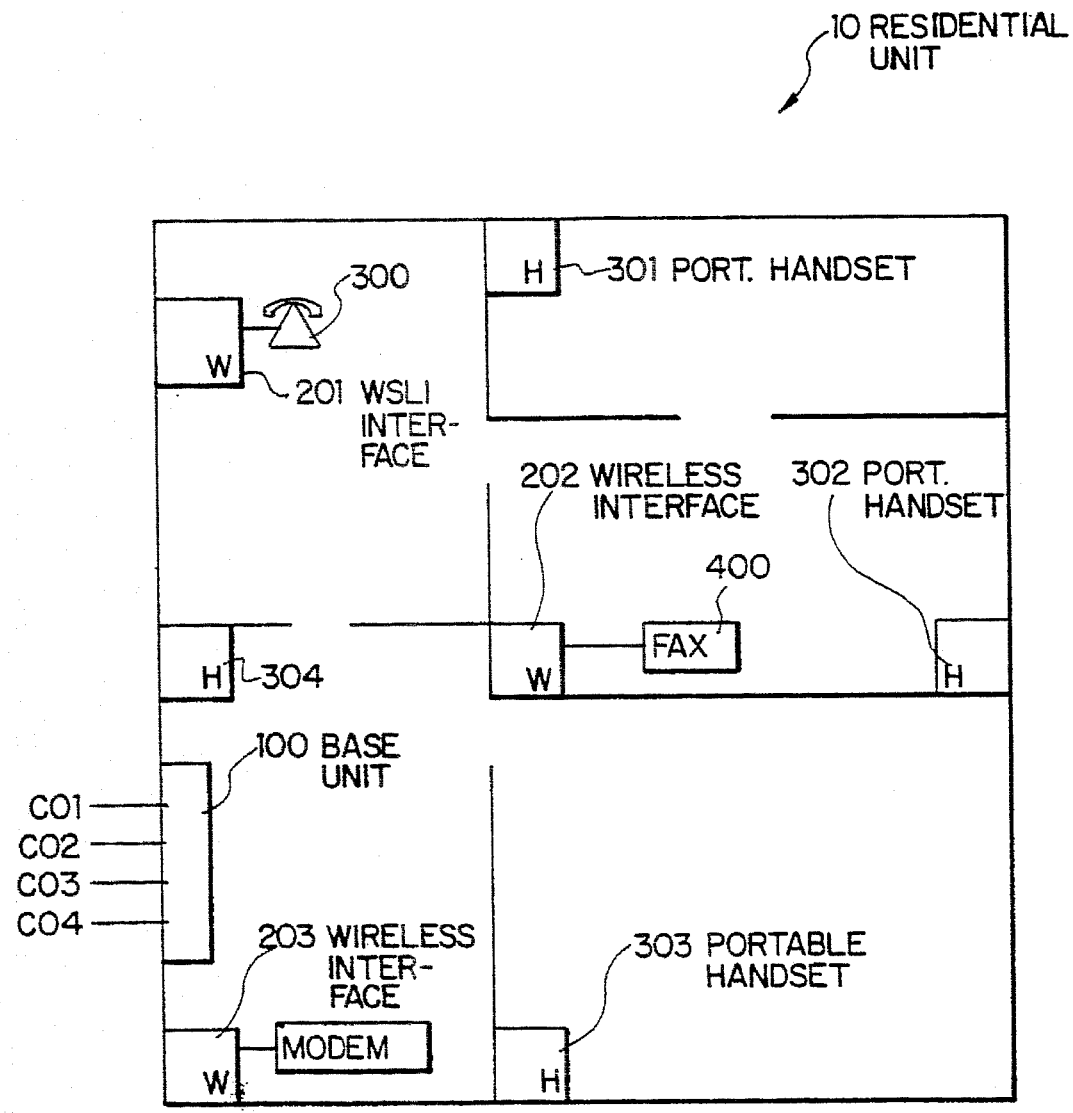
FIG. 1 is a plan view of a residence having the elements of the invention incorporated therein.

Before describing the construction and operation of a preferred embodiment of the invention, reference is made to FIG. 1 to show the manner in which it may be employed. More particularly, FIG. 1 is intended to represent the floor plan of a residential unit 10 which includes several rooms. The residential unit 10 has incorporated therein a base unit 100 and several cooperating units including portable handsets 301–304 and, in addition, WSLI interfaces 201–203. As is represented in FIG. 1, the base unit 100 is connected to 4 telephone lines, termed CO1 (representing Central Office line 1) through CO4. While a base unit 100 interfacing up to 4 central office lines is illustrated, it will be apparent that by employing the principles of the invention, more or less than 4 central office lines can be accommodated. The purpose of the inventive apparatus is to provide for connectivity between one or more of the central office lines CO1–CO4 and line-type telephony devices such as conventional telephones 300 and a facsimile machine 400 or a modem 500 or connectivity to one or more portable handsets. It is an important advantage of the present invention that wired connections between the central office entrance point (at the base unit 100) and any one of the telephones 300, facsimile machine 400 or modem 500, or the telephone handsets 301–304, is replaced by the RF media as will be described. For purposes of this description, we will assume that the system supports the 7 remotes, which are illustrated.

While FIG. 1 shows the seven remotes at particular locations within the residence 10, it will be apparent that any remote can be moved at will inasmuch as there is no physical connection between the C.O. entrance at base unit 100 and the remote. The only physical requirement for each remote is a source of power. The power source could be either a hard wired connection to a 60 Hz power source or alternatively a battery source. Neither type of power inhibits portability of the remotes.

As will be described in greater detail the remotes come in two varieties. There is a portable handset identified with reference characters 300 et seq. (described in connection with FIG. 4) and the WSLI identified with reference characters 200 et seq (described in connection with FIG. 5). The portable handset remote 300 includes a microphone and speaker and is typically used for voice services. The WSLI has a conventional telephony connection device (such as an RJ-11) to facilitate interconnection of any of a conventional telephone, modem, facsimile machine or other wired telephony device. Because the RF media provides a full bandwidth 300–3.4 KHz uncompressed audio channel to any remote, the WSLI (in contrast to a cordless telephone) supports facsimile or modem services.

Figure 3:
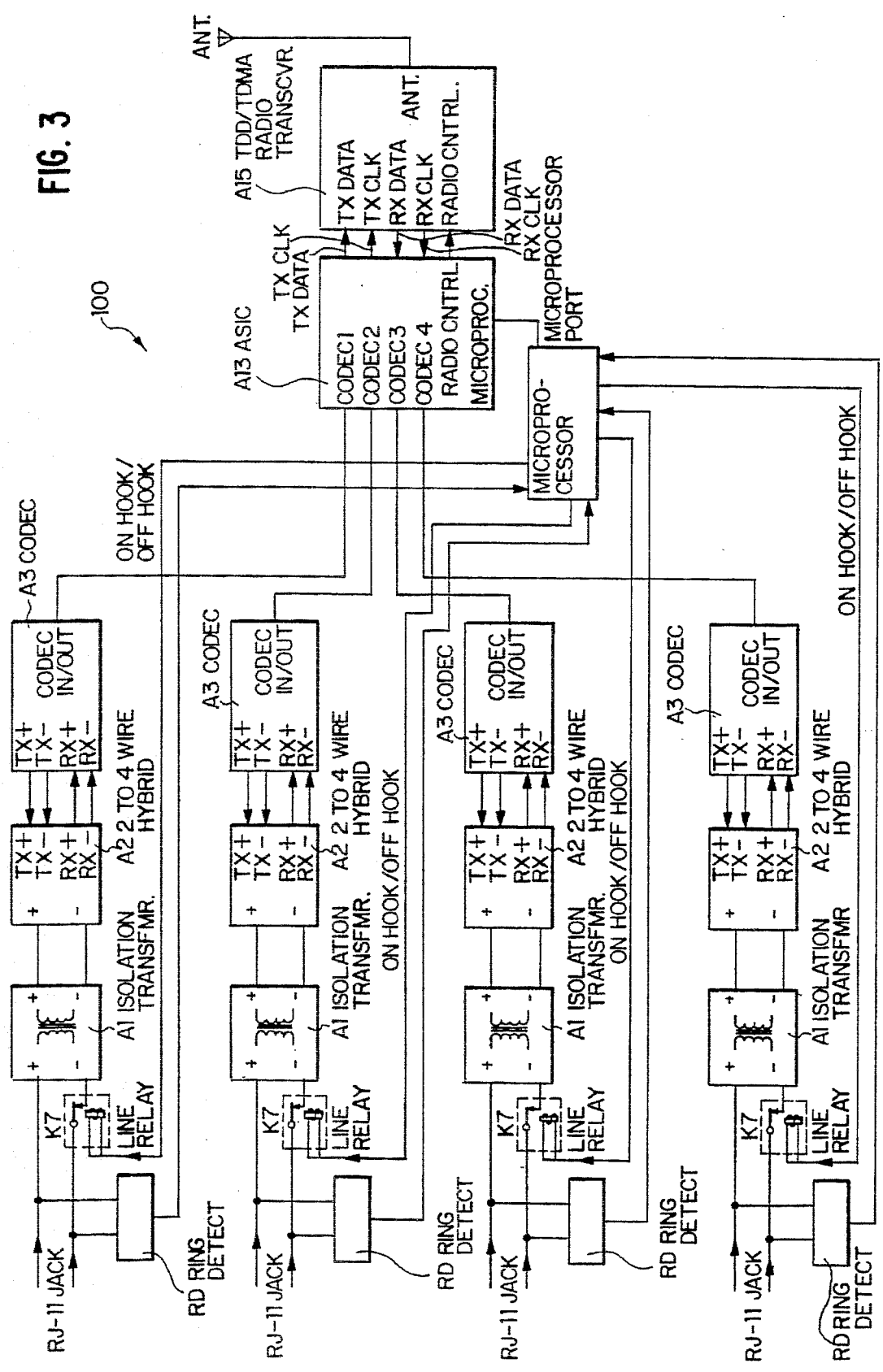
FIG. 3 is a block diagram of a base unit 100 incorporating the principles of the present invention.

FIG. 3 is a block diagram of the base unit 100. As seen in FIG. 3, base unit 100 includes an isolation transformer A1 for each of the 4 central office lines CO1–CO4. Each of the isolation transformers A1 is connected in turn to a 2-wire-to-4-wire hybrid A2. Each of the hybrids A2 is connected in turn to a codec A3. The base unit 100 also includes a switching/processing unit A13. The switching/processing unit A13 includes 4 ports, one for each of the codecs A3. The switching/processing unit A13 interfaces with the Time Division Duplex/Time Division Multiple Access radio transceiver A15. This interface between the switching/processing unit A13 and the transceiver A15 includes 5 separate paths, two paths carry transmit data and clock from the switching/processing unit to the transceiver, two additional paths carry receive data and receiver clock from the transceiver to the switching/processing unit, and a single additional path provides for control of the transceiver by the switching/processing unit. The switching/processing unit A13 also includes a user interface which is implemented via a conventional microprocessor. In order to control the microprocessor and manifest commands via the user, a keyboard or keypad is employed. The purpose for the user programmability or configuration control will be described below.

The base unit is user configurable to allow any combination of connections to be made between the incoming phone lines and the remotes. The interface required for the user to configure the base unit could take a number of different forms that include (but are not limited to) connection to a personal computer, voice synthesis and recognition circuitry, keypad and LCD display, touchtone and LCD display, voice synthesis and touchtone.

Standard 64 Kbps digital encoding is used to convert the analog phone signals to digital format. Digital signal processing compression of the encoded bit rate is not necessary. Adaptive echo cancellation techniques is used to minimize the near-end echo caused by delay in the digital circuits and phone line mismatch. The use of uncompressed analog-to-digital conversion and the addition of echo cancellation provides the user with a full bandwidth, distortion-free connection to the phone company. This high quality phone channel is necessary for high-speed fax machines and modems and is required to provide the consumer with a "transparent" connection to the incoming lines.

The network access technique is TDMA/TDD. This term is an abbreviation for Time Division Multiple Access with Time Division Duplex operation. In a TDMA/TDD system each unit in the network may obtain a fixed time slot to transmit and a fixed time slot to receive. In the present embodiment of this invention, the network will have a total of eight time slots consisting of four remote-to-base transmission periods followed by four base-to-remote transmission periods. These eight slots together comprise a single frame. Since the system is Time Division Duplexed (TDD), every remote will have a receive slot for each transmit slot during the frame. The base unit and all of the remote units operate on the same frequency channel for both transmit and receive intervals during a frame. If interference is encountered by any of the units while on this channel, then the base and all remotes will make a coordinated frequency change to another channel to avoid the interference. This is referred to as reactive frequency hopping. The reactive hopping technique also allows multiple systems to operate when in close proximity to each other by having each system select a clear channel not in use by any of the others.

The modulation technique may be any type of angle or angle/amplitude modulation, but in a preferred embodiment is GMSK. Direct sequence or proactive frequency hopping, spread spectrum techniques may be overlaid on the modulated signal to broaden the bandwidth and reduce sensitivity to interferers and multi-path distortion. Since this product is used in the immediate vicinity of the home, low power operation of the transmitters is anticipated. Lower transmitted power will provide for more re-use of channels in dense neighborhoods that might have a number of systems.

The functionality of the WSLI and the base unit could be expanded to include facsimile/modem modulation and demodulation. In this expanded embodiment, modulated information coming from a fax machine or modem connected to a WSLI is demodulated (see FIG. 8) by the WSLI and converted to digital form. These relatively low speed bits are then encoded with some type of redundant, forward error correction, coding scheme. The encoded bits are buffered, converted to the standard slot data rate and transmitted to the base unit. The base unit demultiplexes these bits, reformats them as fax or modem data, and remodulates the bits for transmission over the phone line.

This process is reversed while receiving incoming fax or modem information. The base unit demodulates the fax or modem information coming in from the outside phone lines. The resulting digital bits are encoded with a forward error correction code, converted to the standard slot data rate and transmitted to the WSLI. The WSLI demultiplexes the bits, re-formats them for fax or modem data rates and then re-modulates the bits for transmission to the modem or fax.

An additional embodiment of the invention is a version with an ISDN base unit. A standard 2B+D ISDN data frame consists of two 64 Kbps slots for voice, one 8 Kbps slot for data and one 8 Kbps slot for signalling. Therefore, one ISDN line can support two voice circuits and one data circuit. An ISDN-compatible base allows the user to have access to two voice circuits and one low speed data circuit with only one incoming phone line. The 64 Kbps voice slots is also used for data transmission if data-rate speeds higher than 8 Kbps are required. No codecs are needed in the base unit since the incoming and outgoing information is already in digital format. Digital circuitry is used to convert the ISDN data to HPCS format and back again.

Figure 4:
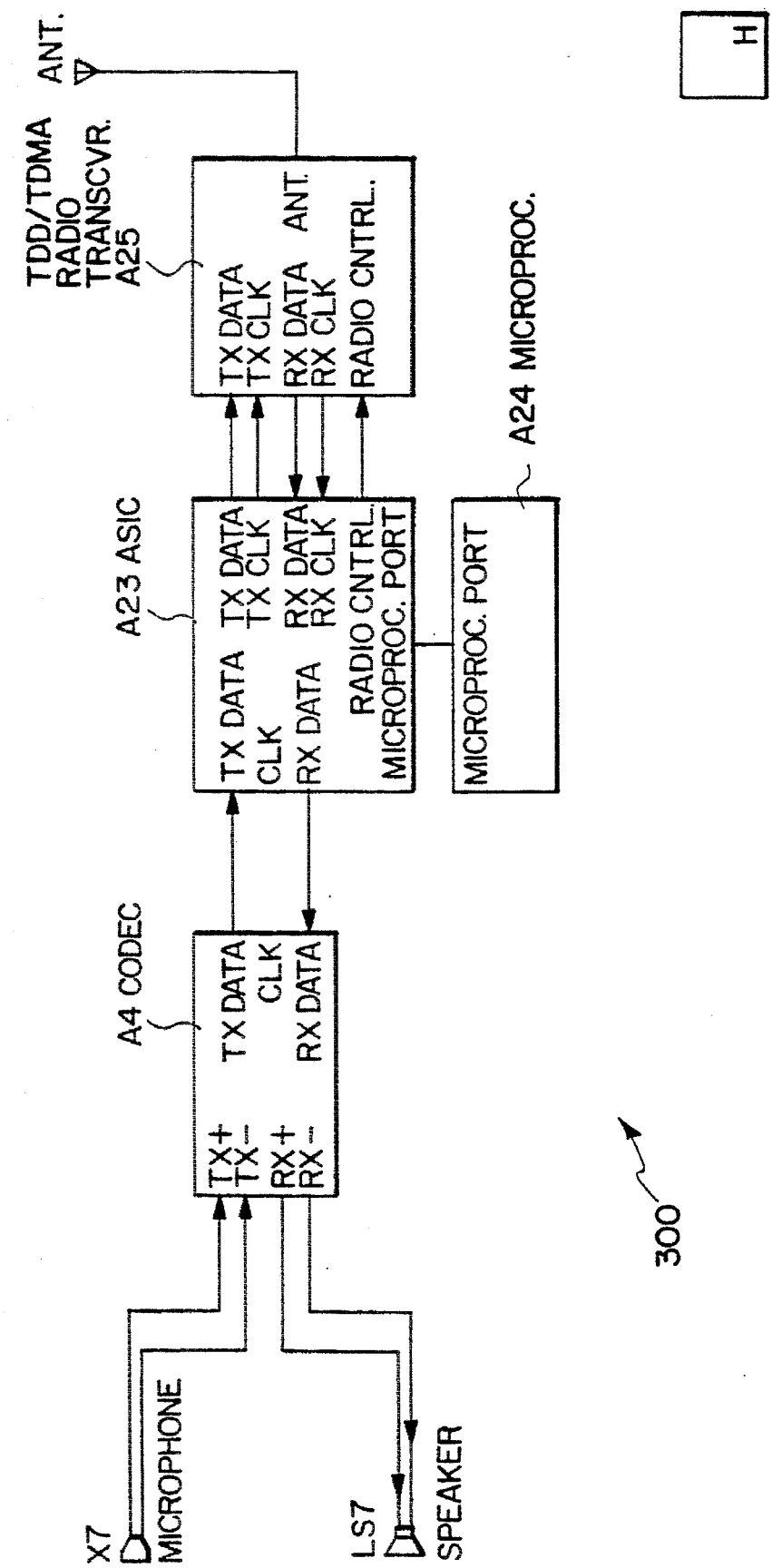
FIG. 4 is a block diagram of a portable handset such as the handset 200 incorporating the principles of the present invention.
Figure 5:
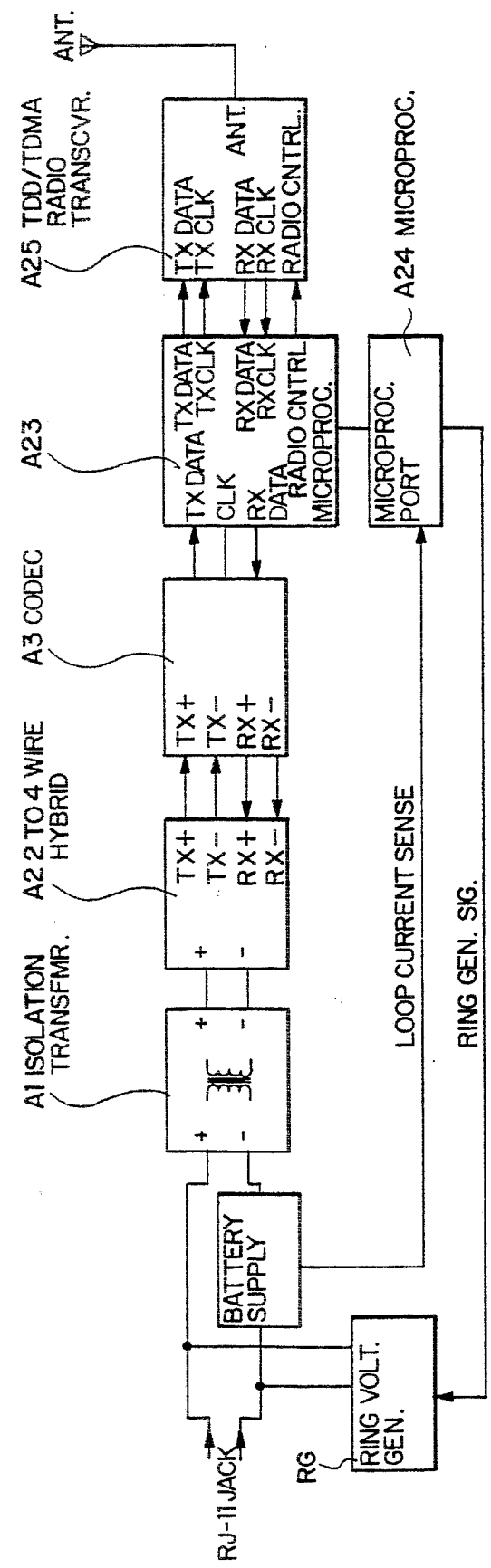
FIG. 5 is a block diagram of a WSLI 300.

FIG. 4 comprises a block diagram of a typical handset, such as the handset 300. The handset of FIG. 4 includes a codec A3, a switching/processing unit A23, its associated microprocessor A24 and a radio transceiver A25. Although not illustrated, the handset 300 may include a dial keypad as in a conventional "cordless" telephone. Referring to FIG. 5, the WSLI illustrated includes an isolation transformer A1 coupled to a conventional telephony connection point such as the RJ-11 jack. The isolation transformer A1 (which may not be necessary) in turn is connected to a 2-wire-to-4-wire hybrid A2. The 2-wire-to-4-wire hybrid A2 is connected in turn to a codec A3. The codec A3 is connected in turn to a switching/processing unit A23 and the switching/processing unit A23 is connected, in turn, to the TDD/TDMA transceiver A25.

Referring to FIGS. 3, 4 and 5, it will be apparent that the base unit 100 includes an isolation transformer A1 for each of the C.O. lines, and likewise, the WSLI includes an isolation transformer which is used to couple the signals from the line type telephony device (conventional telephone, modem or facsimile machine, etc.). In like fashion, the isolation transformer A1 and the base unit 100 couples these C.O. lines. The 2-to-4-wire hybrid A2 operates to change the 2-wire format to the left of the hybrid into the 4-wire format on the right. The 4-wire format in the WSLI as well as in the base unit 100 is then coupled to a codec A3. As shown in FIG. 4, the handset also includes a codec A4. The codecs A3 and A4 have the function of converting analog signals received from the hybrid (in the case of the WSLI or base unit) or from the microphone in the case of the handset) to digital form and, conversely, converting digital signals received from the switching/processing unit A23 (of the WSLI or handset or from the switching/processing unit A13 of the base unit) into analog form and coupling those analog signals to the 2-to-4-wire hybrid.

The switching/processing unit A23 receives the digital data from the codec A3 at one rate and, with the appropriate timing, provides those signals to the radio transceiver A25 or A15 at the higher burst rate. Likewise, the switching/processing unit A23 receives digital data from the radio transceiver A25 or A15 at the burst rate and provides that digital data to the codec, at the appropriate lower rate. The microprocessor A24 of the handset also responds to user manipulations to signal such conditions as on-hook/off-hook and dialing signals.

In general, the switching processing unit performs the following:

1) Multiplex and convert the incoming data from the codecs into a serial data stream that can be handed off to the radio transceiver for transmission. The rate of this serial data stream will be slightly faster than eight times the 64 Kbps rate. The increased data rate arises because of the eight time slot TDMA/TDD format plus system overhead and supervisory channel bits. The overhead and supervisory bits are expected to add about 10 Kbps to the data stream. The conversion of the slower codec rates to the higher transmission data rate will be handled by FIFOs and buffers (see FIGS. 9A and 9B).

2) Demultiplex and convert the 8X serial data stream coming from the transceiver into the individual 64 Kbps streams for each codec. This process is basically the reverse of the one described above.

3) Receiver clock recovery. The 8X serial data stream coming from the transceiver is fed into a circuit that extracts a clock signal. This recovered clock is used to synchronize the FIFO circuits and the data buffers used in converting the demultiplexing the received serial data stream into the individual 64 Kbps codec data streams. The recovered clock is sent along with the received data to the codecs.

4) Convert the multiplexed, serial data stream into the required baseband modulation signals that will then be fed to the transmitter. This conversion could be as simple as just filtering the data bits or as complicated as creating I and Q components to be used in a quadrature modulator. In either case, the modulation signal(s) would be more than just a simple logic level bit stream.

Conversely, in the base unit 100, the microprocessor A14 provides ring detect information from one of the ring detectors RD to indicate that one of the C.O. lines has an incoming call. The microprocessor A14 also controls an associated line relay to indicate an off-hook or on-hook condition, as appropriate. The manner in which this information is provided to the microprocessor A14 and the manner in which it is used will be described below.

Figure 9A:
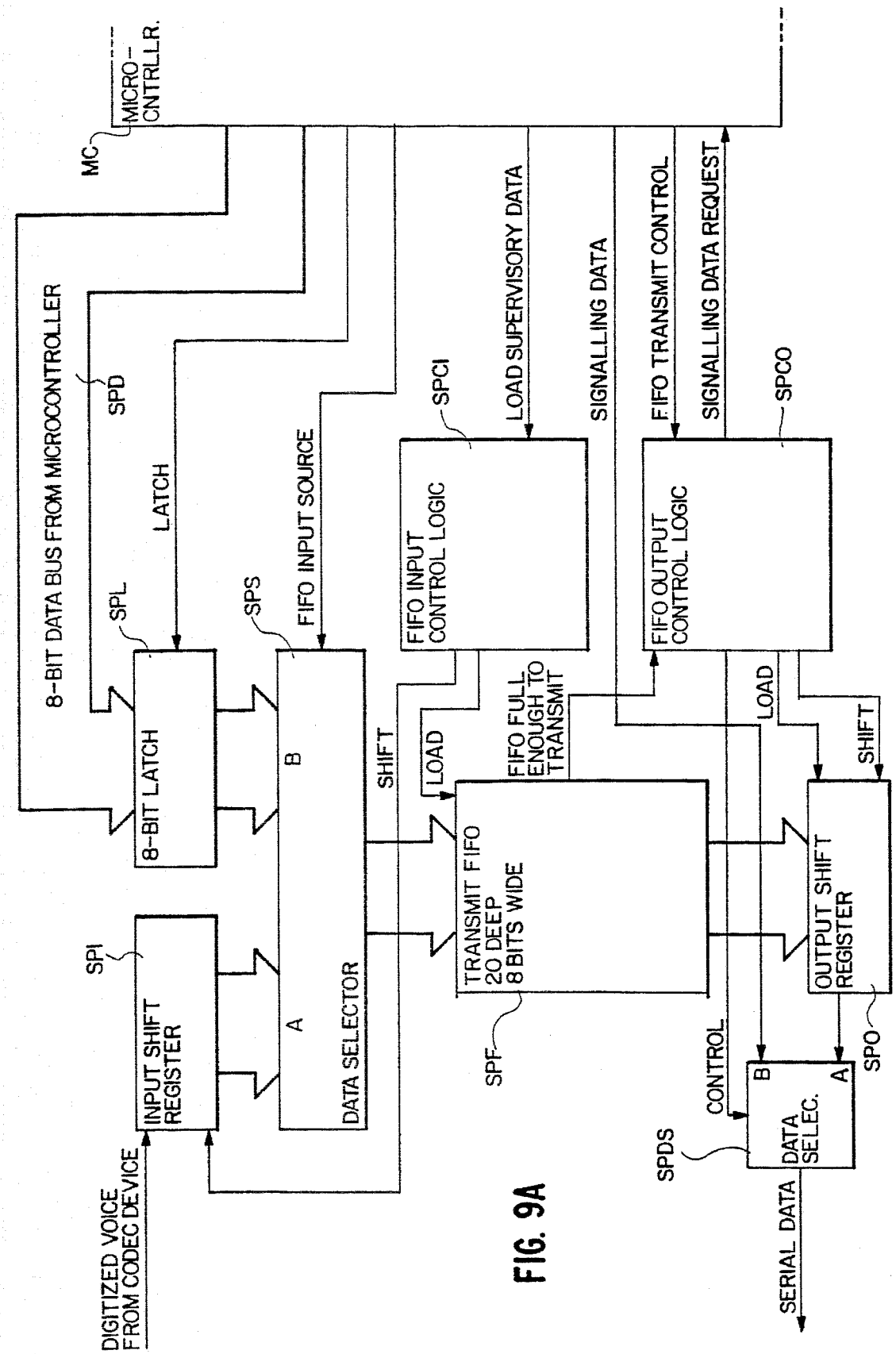
FIGS. 9A and 9B are a more detailed block diagram of a suitable switching/processing unit such as that contained in a WSLI 300 or a handset 400.
Figure 9B:
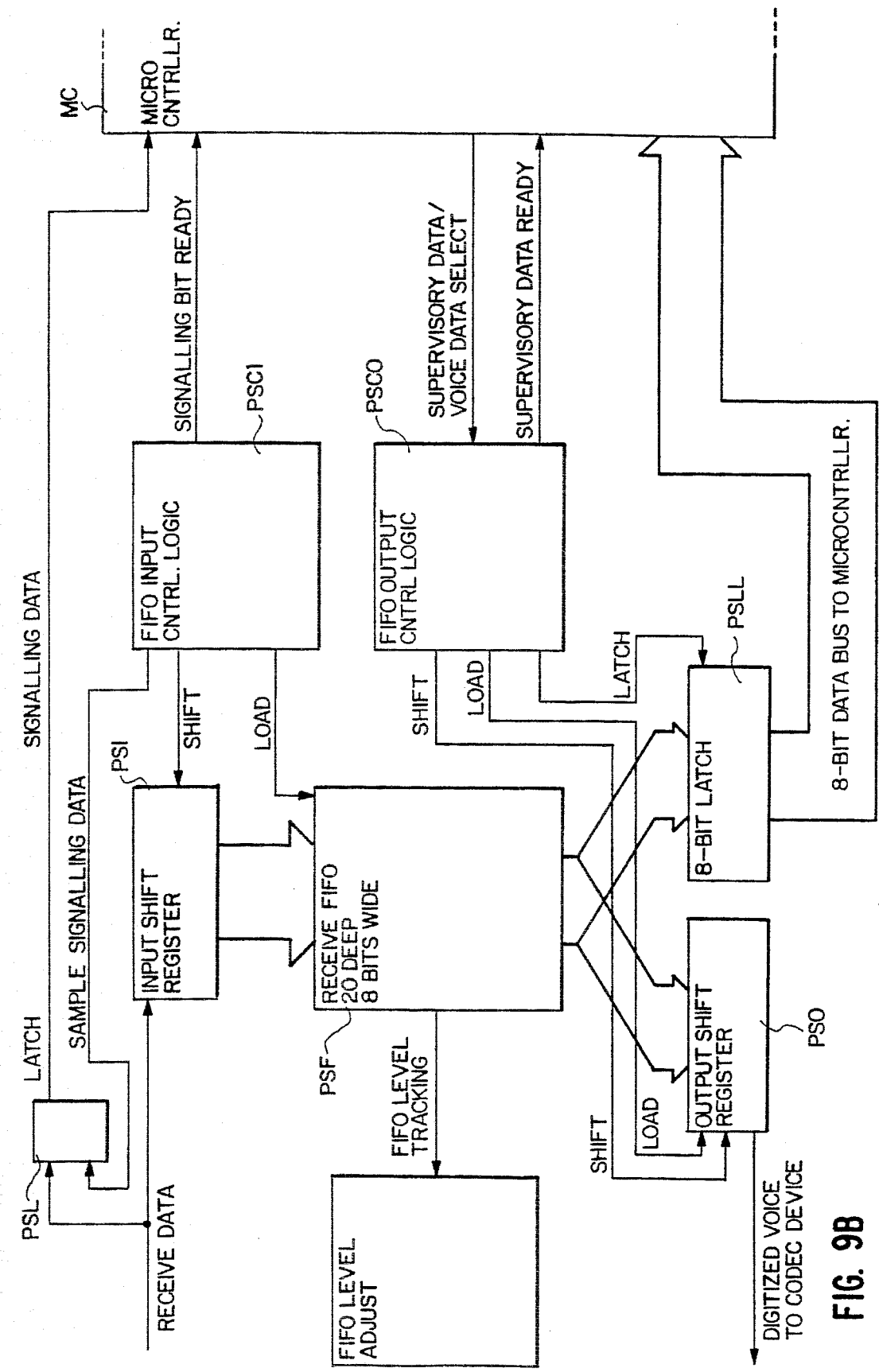

FIGS. 9A and 9B show the data and control paths in the switching/processing unit A23. FIG. 9A shows the transmit side of the switching/processing unit A23. As shown, input data for transmission is input to the shift register SPI. This data is clocked commensurate with a 64 Kbps voice channel rate. The microcontroller MC is coupled to an 8-bit latch SPL via a data bus SPD. Thus, if necessary, the microcontroller MC can load the latch SPL with signaling data for transmission. The outputs of the shift register SPI and latch SPL are coupled to a data selector SPS. A control input from the microcontroller MC selects which input source will be coupled through the data selector SPS. The output of the data selector SPS is coupled to a transmit FIFO SPF. The output of the transmit FIFO SPF is coupled to an output shift register SPO. The output of the shift register SPO is coupled to one input of a data selector SPDS. A FIFO input control logic SPCI and output control logic SPCO are provided to interact with the microcontroller MC, the input shift register SPI, transmit FIFO SPF, output shift register SPO and output data selector SPDS.

In operation, when a conversation is in progress, data is received at the input shift register SPI, on a regular basis. It is the function of the apparatus of FIG. 9A to collect that data and output it in burst form via the serial data path output of the SPDS.

FIG. 9B, on the other hand, shows the receive function of the switching/processing unit A23. As shown in FIG. 9B, receive data (from the transceiver) A25 is input to the input shift register PSI. The receive data path is also connected to the input of the latch PSL. The output of the latch PSL provides a signaling data path to the microcontroller MC. Data from the input shift register PSI is provided in parallel form as an input to the receive FIFO PSF. The receive FIFO PSF provides outputs to an output shift register PSO and to an 8-bit latch PSLL. The switching/processing unit A23 also includes input control logic PSCI and output control logic PSCO which cooperates both with the microcontroller MC, the input shift register PSI and output shift register PSO and the latch PSLL. The output of the latch PSLL is provided over a data bus to the microcontroller MC. On the other hand, the serial output of the output shift register PSO is provided as an input to the associated codec A3. Of course, the data rate into codec A3 is commensurate with the data rate from the codec A3.

Figure 10:
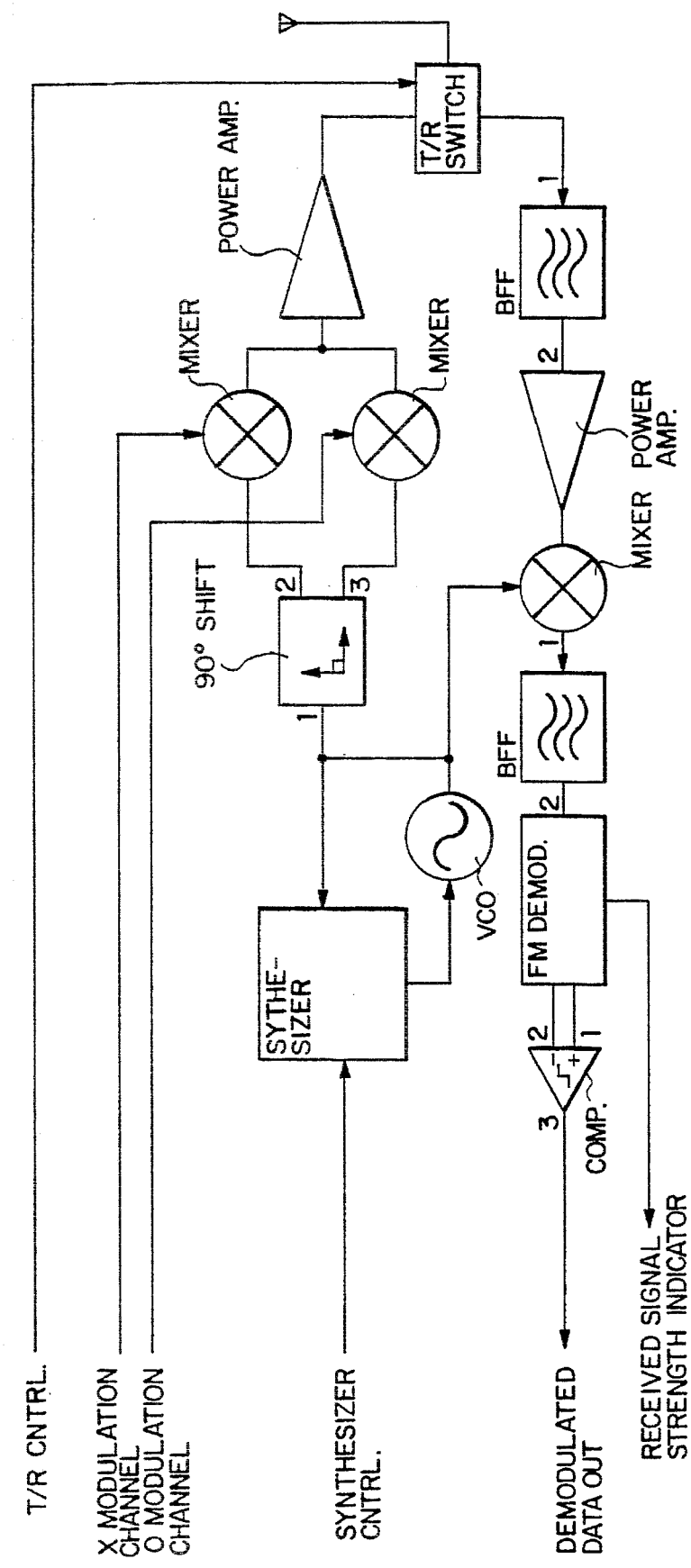
FIG. 10 is a detailed block diagram of a suitable transceiver such as the transceiver contained in the WSLI 300 or the handset 400.

FIG. 10 is a block diagram of a suitable radio transceiver which can be operated in accordance with the TDD/TDMA format.

Before describing the operation of a system such as that illustrated in FIG. 1, reference is made to FIGS. 11A and 11B to show a typical configuration session. The configuration session need only be accomplished once, although the user can change it at will. The configuration session results in data which is stored in the microprocessor A14 of the switching/processing unit A13 of the base unit 100. There are a variety of ways in which the user can interact with that microprocessor in order to achieve the necessary configuration. A simple interaction is accomplished via a keyboard. Other interactions involve the use of touchtone telephones or interaction via a remote intelligent process which is then capable of downloading the appropriate data to the microprocessor.

In order to configure the system, it is necessary for each of the remotes to have an address. Preferably, the address is "permanent", i.e. each remote carries a unique identity or address from the manufacturer. While the product could come with documentation identifying the address for each remote, and the user could input this address on a keyboard, a simpler process is envisioned. Because the base unit 100 inherently can communicate with any of the remotes, each remote can be powered up in turn to allow the base unit to "learn" the address of that particular remote. When the base unit has acquired the address of one remote, that remote can be powered down and the next remote powered up, and so on. In this fashion, the base unit 100 can acquire a list of the remotes to be configured.

In any event, after initiating the configuration session, the first function, F1, requires the user to select a line. Of course, each of the C.O. lines has a directory number. However, for purposes of configuring the communications system, each C.O. line may be identified by the port at the switching/processing unit A13 to which it is connected. Therefore, the C.O. line connected to the input "codec 1" would be line 1, etc. The user, at function F1 for example, selects a line such as line 1. In step F2, the user specifies (such as via the keyboard or the like) those remotes in the system which are to ring when the corresponding line is in a ringing state. When the user indicates that he has identified all of the remotes which are to ring for this line, function F3 is performed to list the remotes which should be allowed to access that C.O. line. When the user manifests that function F3 is completed, function F4 is performed to check whether there are any more lines which require configuration information. If there are, process loops back and functions F1–F3 are performed for a different line. Once all lines are configured, the process is complete.

FIG. 11B shows a table which is created in the microprocessor, storing the data which is input by the user. Referring to FIG. 11B and FIG. 1, the table includes an indication that when line 1 is in a ringing state, remotes 201, 203 and each of 301–304 should ring. This allows the call to be answered at any of these locations. Likewise, the table indicates that remotes 201, 203 and 301–304 are allowed to access line 1. The data in the table of FIG. 11B for line 2 is identical to line 1. The data in the table of FIG. 11B for line 3 shows that only remote 301 will ring in response to the ringing state of line 3, and likewise, only remote 301 is allowed to access line 3. Thus, line 3 is configured as a private line solely for the use of remote 301. Line 4 is likewise dedicated to remote 202. In the case of remote 202, however, this remote serves a fax machine 400. It should be understood that while it is important for the base unit to store the configuration table shown in FIG. 11B, there are circumstances in which this information is also useful at each remote. Accordingly, the table, as part of the configuration session, can be transmitted to each other remote in the system, so that the data is duplicated in each of the remotes.

The operation of the invention can be explained as follows.

Assume that one of the C.O. lines 1–4 undergoes a transition from an idle condition to a ringing condition, e.g. for an incoming call. That ringing condition is detected by the ring detector RD (see FIG. 3) associated with the C.O. line. The microprocessor A14 is notified of the ringing line and, after consulting with the table shown in FIG. 11B, inserts a signaling message for the remotes associated with this line. For example, if the C.O. line in a ring state was associated with a dedicated remote, only that remote would receive the signaling message. When received, it will stimulate the microprocessor A24 to activate the ring generator RG (FIG. 5) which will ring the associated telephony line device, e.g. conventional telephone, modem or facsimile machine. Assuming that that machine is "answered", i.e. it goes off-hook, that condition will generate a signaling message to the microprocessor A24 which will result in transmission of a signaling message to the base unit 100. The microprocessor A14 of the base unit 100 will recognize that the received signaling message is associated with the previously-transmitted message which resulted in operation of the ring generator RG. As a consequence, the two sources, i.e. the particular C.O. line and the particular remote, will be associated with a common channel so that information received from the C.O. line will be put in the slot destined for the remote, whereas information received from the remote will be retrieved and provided to the C.O. line. In this fashion, a circuit connection is established. This connection will remain "up" until either the C.O. or the associated remote goes "on-hook" or idle. The change in state generates a signaling message which is recognized to cease use of the frame. Whereas the previous scenario postulated a call initiated to the system of FIG. 1, the system of course can initiate calls destined for completion over the public switched telephone network. Such a scenario begins by a user manipulating one of the remotes (either a handset or a WSLI) so that its state is changed from idle or on-hook to off-hook. The off-hook transition will generate a signaling message to the base unit 100. As is conventional, a message includes the source address, i.e. the identity of the remote initiating the message. At the base unit 100, the table of FIG. 11B is consulted to identify what C.O. lines this particular remote is entitled to access. The base unit 100 also has "visibility" of the condition of the C.O. lines, i.e. in use or idle. Assuming there is a match between a C.O. line which the remote is entitled to access and an idle C.O. line, the base unit initiate an on-hook to off-hook transition for that C.O. line. This will initiate receipt of a dial tone at the associated codec. Receipt of the dial tone is tantamount to receiving voice information, and the base unit acts accordingly, i.e. the information is digitized and transmitted in an appropriate slot to the remote which initiated the sequence. As a consequence of the foregoing, the user having forced the remote to an off-hook state, will "hear" the dial tone whose source is at the C.O. line which has been enabled by the off-hook message to the base unit. At this point, the user can "dial" the desired connection. Dialed digits can be treated either as signaling data or as audio and, in any event, the result is repeating the dialed digits by the base unit to the appropriate C.O. line. The user, rather than dialing an outside call would well have dialed the identity of another remote. The base unit has sufficient intelligence to differentiate a call destined for the public switched telephone network from a call designating a remote. The base unit 100, in addition to detecting the addressing of a remote, also has information respecting the on-hook or off-hook status of that remote. Thus the base unit can, if a remote is addressed and is on-hook, cause a ringing message to be transmitted to that remote in order to complete the connection between the calling and called remote.

In general, a frame with 8 slots corresponds to 4 channels, which allows 4 simultaneously, separate circuits. Each circuit can include one of the C.O. lines and one of the remotes. Alternatively, a circuit can include 2 remotes, in the absence of a C.O. line.

If desired, 2 "circuits" can be associated in a single conversation so that, for example, 2 remotes and a C.O. line can be conferenced together A "circuit" which is necessary to support a conversation, requires a path, for example at each remote for talking and listening. The talking path is used to carry the voice from the remote to the base, whereas the listening path is used to carry voice traffic from the base to the remote. If a conversation is to include three sources, say remote A and remote B as well as a C.O. line, each of the remotes has a dedicated transmit slot to carry voice traffic from that remote to the base unit. At the base unit, the data from remotes A and B are combined to provide the voice traffic to the C.O. line. The listen slot for remote A will include a concatenation of voice traffic from the C.O. line and voice traffic from remote B, and the listen slot for remote B will likewise be a concatenation or summing of voice traffic from the C.O. line and voice traffic from the remote A.

Figure 6:
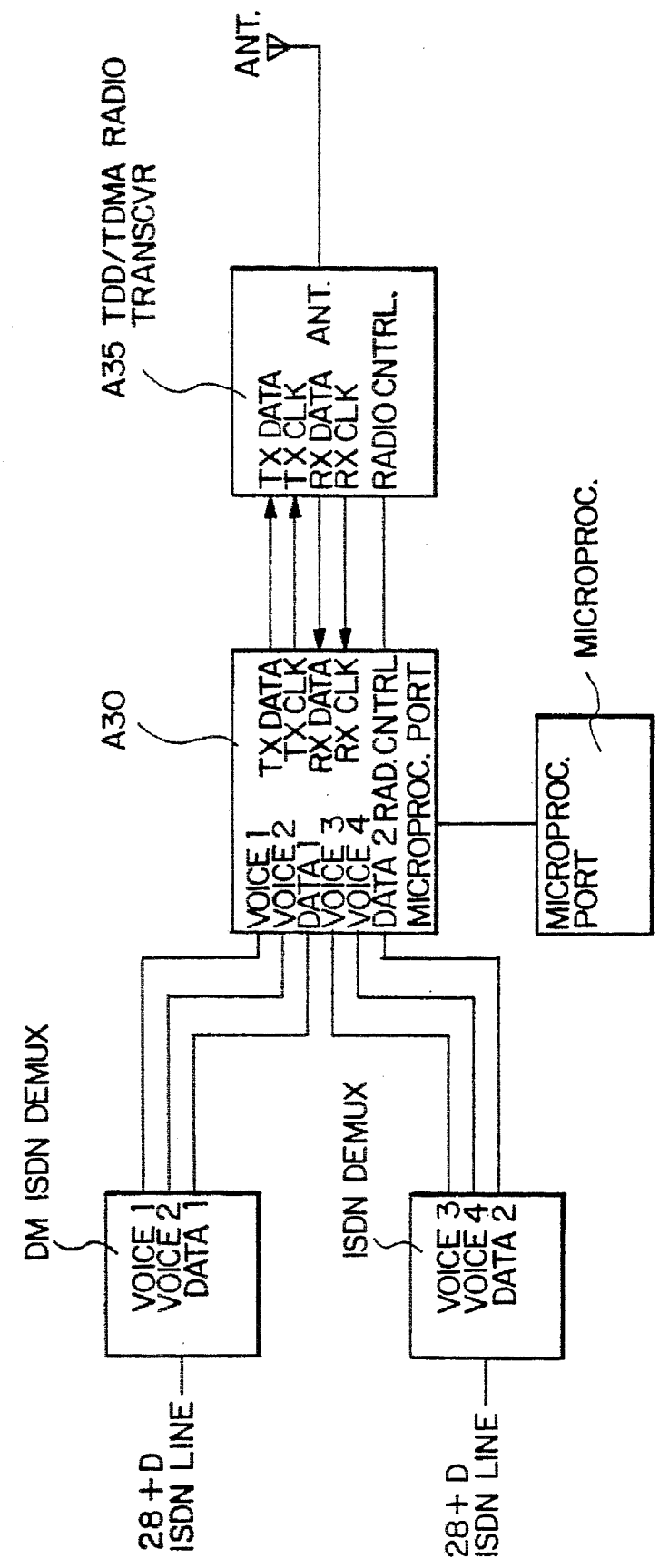
FIG. 6 represents a base unit 101 compatible with ISDN technology which can be used in lieu of or in combination with the base unit 100 of FIG. 3.

FIG. 6 shows an alternative base unit to the base unit 100 of FIG. 3. The base unit of FIG. 6 is ISDN compatible. An ISDN "port" carries 2B+D, that is 2 bearer channels 1 data channel. Accordingly, each ISDN line is coupled to a demultiplexer DM. The demultiplexer provides 2 voice line (noted as voice 1 and voice 2 in FIG. 6) and a data line, input to a switching/processing unit A30. The second ISDN line shown in FIG. 6 is also coupled to a similar demultiplexer DM which provides 2 additional voice paths and an additional data path to the switching/processing unit A30. Thus, the switching/processing unit A30 has 4 voice paths (voice 1–voice 4) and 2 data paths (data 1 and data 2). The switching/processing unit A30 is in turn coupled to a TDD/TDMA radio transceiver A35.

The ISDN-compatible base unit shown in FIG. 6 can be substituted in lieu of the base unit 100 of FIG. 3 for cooperation with ISDN telephony lines in lieu of the conventional telephone line associated with the base unit 100 of FIG. 3. Since the ISDN lines are digitized, no codecs are needed.

Figure 7:
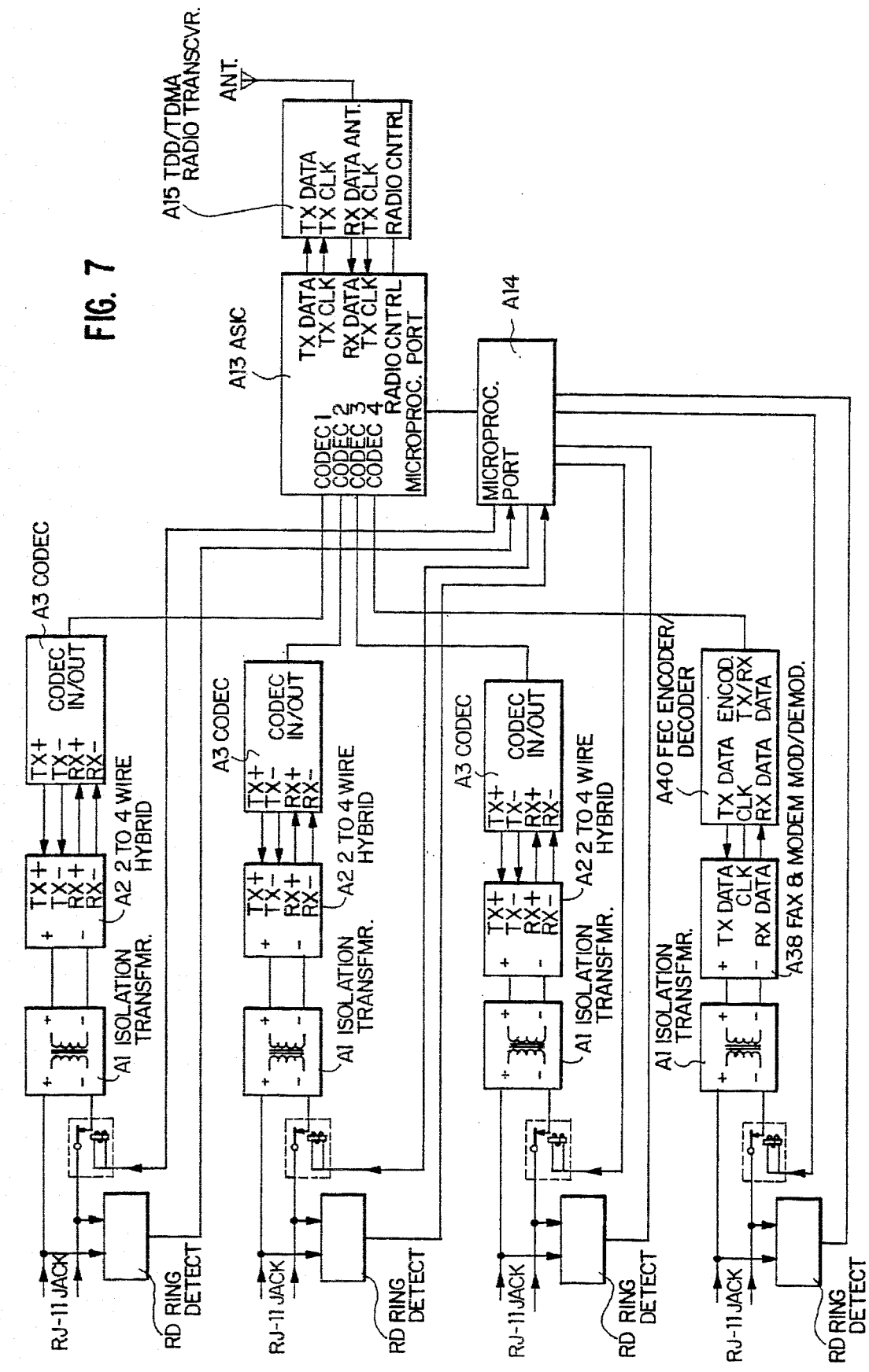
FIG. 7 is a modified version of the base unit 100 which provides for a dedicated digital channel to increase the capabilities for facsimile and modem applications.
Figure 8:
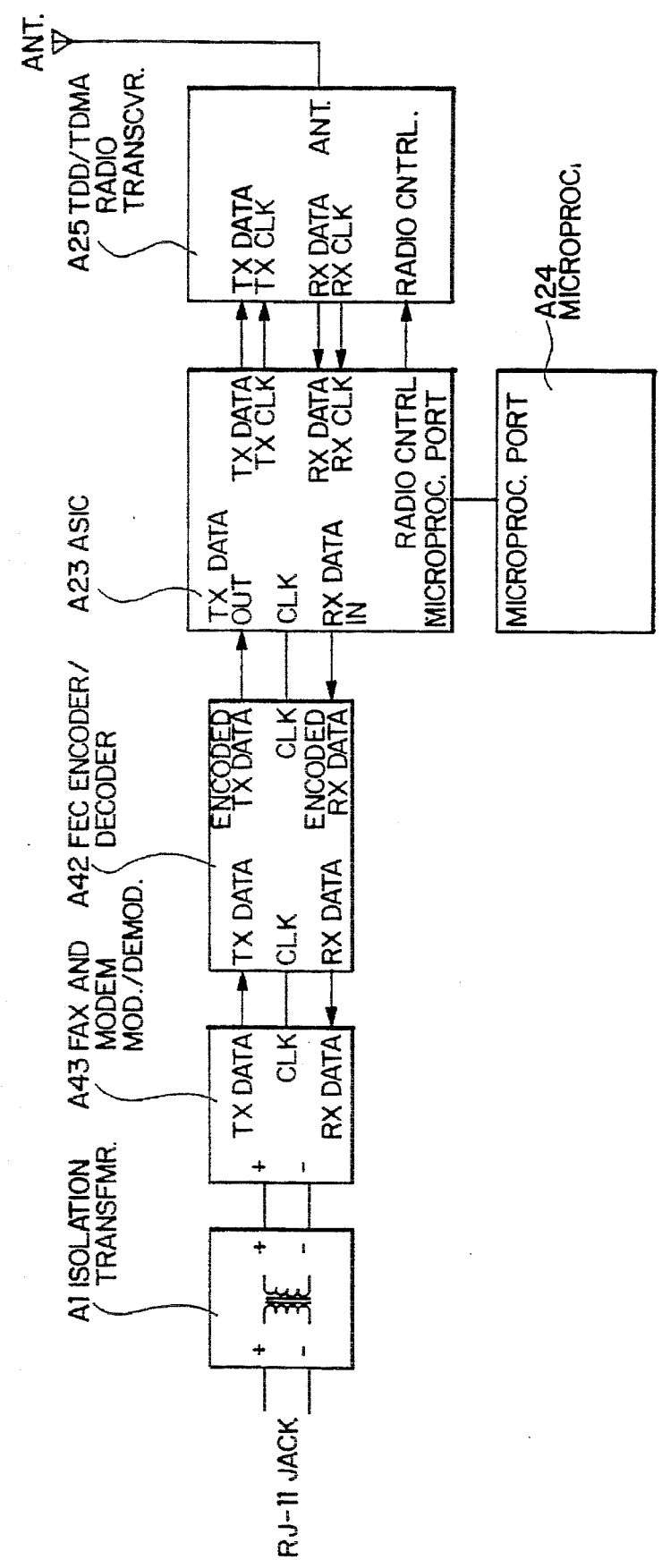
FIG. 8 is a block diagram of a WSLI arranged to cooperate with the dedicated digital channel of the base unit of FIG. 7.

FIGS. 7 and 8 show a variant in which the functionality of the WSLI and the base unit 100 are expanded to include facsimile/modem modulation and demodulation. Referring to FIGS. 7 and 8, FIG. 7 shows a modified base unit, one which differs from the base unit of FIG. 3 in that rather than having a hybrid such as the hybrid A2, the base unit shown in FIG. 7 with respect to the lowest-most C.O. line, has a facsimile and modem modulator/demodulator A38. In addition, rather than having the codec A3 as is associated with the other C.O. lines for the base unit of FIG. 7, the fax and modem modulator/demodulator A38 is coupled to the switching/processing unit A13 via a forward-acting error correction encoder/decoder A40. The cooperating WSLI remote (see FIG. 8) has a corresponding fax and modem modulator/demodulator A43 and a corresponding forward-acting error correction encoder/decoder A42. More particularly, the WSLI of FIG. 8 receives for example facsimile modulated information on its input via the isolation transformer A1. The facsimile and modem modulator/demodulator A43 demodulates the information received from the facsimile machine and provides digital data corresponding to the output of the associated facsimile machine to the forward-acting error correction encoder A42. The encoded bits are then buffered and converted to a standard data rate for the communications system and transmitted to the base unit (of FIG. 7). In the base unit, the forward acting error corrected data is coupled to the forward acting error correcting encoder/decoder A40 where the forward acting error correction is stripped out, and the data converted to its raw digital form. The data in the raw digital form is then provided to the facsimile and modem modulator/demodulator A38 where the digital data is again modulated and coupled via the isolation transformer A1 so as to appear in the form in which the isolation transformer A1 (of the WSLI) had received the data initially. The demodulation (at A43), forward action error correction (at A42) and the corresponding operation of A40 and A38 increases the robustness of the communication channel. Another variant on the WSLI can employ a similar principle to that which has just been described. Those skilled in the art are familiar with the fact that a conventional modem takes digital information and modulates that information onto a carrier for transmission over the telephone network. As has been described herein, a user can connect a modem to a WSLI which will receive the modulated information from the modem and act as an extension of the telephone network so that the modulated information can be transmitted via the RF media to the base unit from where it is transferred into the wired telephone network. However, inasmuch as the RF media described herein is a digital medium, the modem employed by the user for the transmission of digital information could well be located in the base unit and not external to a WSLI. More particularly, a WSLI may include an RS-232 port which will accept digital information from a computer or the like. The RS-232-type WSLI then accepts the digital information and transmits it over the digital RF media to a base unit such as the base unit 100 of FIG. 3. This base unit, however, is modified so as to employ a modem in lieu of the codec A3. The output of the modem is then applied to the 2-wire-to-4-wire hybrid A2 as if it were a codec A3. While such an RS-232-equipped WSLI and base unit could also support voice services via an RJ-11 port, it is within the spirit of the invention to employ a WSLI which supports only RS-232 services.

Those skilled in the art are readily familiar with TDMA transceivers supporting a multiple access frame such as the frame illustrated in FIG. 2. The Time Division Duplex variant on TDMA provides, in a pair of slots, a bidirectional channel. For example, slots 1 and 5 provide a bidirectional channel between the base and a remote, slots 2 and 6 are a similar channel to another remote, etc. Referring for example to FIG. 2, if we postulate a "circuit" involving CO1 and a remote 303 and further assume that the "call" is initiated from the C.O. line, and at the time the call is received at the base unit 100, there is no other traffic in the system shown in FIG. 1. When the base unit 100 recognizes the incoming call, it will, after consulting the table of FIG. 11B identify, for example, that the call is destined for the remote 303. A signaling message will then be inserted into the slot "base-to-remote A" of FIG. 2, addressed to the remote 303. Assuming that the remote 303 is, at the time, not busy, that is, it is idle, the result of the signaling message, when received at the remote 303, will be a ring condition at the remote. Assuming further that there is a person to answer the call, then the remote will go from the on-hook to off-hook state. This will generate a signaling message back to the base unit. This signaling message will be inserted in the "remote A-to-base" slot of the frame (see FIG. 2). Receipt of this message will indicate to the base unit that the remote 303 has answered the call, and a "connection" will be made. This connection is really an entry into a memory location which indicates that voice traffic from CO1 will be inserted in the slot of the frame "base-to-remote A". Likewise, at the remote 303, the switching/processing unit will ensure that voice traffic from the remote is placed in the slot "remote A-to-base". The switching/processing unit of the remote 303 will extract voice traffic from the slot "base-to-remote A", and convert that voice traffic to analog form. The base unit, conversely, will extract voice traffic from the slot "remote A-to-base", convert that voice traffic to analog form, and provide it to CO1. This state of affairs will remain until one or the other of the CO1 and remote 303 goes on-hook. That change of state will result in tearing down the "circuit", i.e. eliminating the data which had previously directed the exchange of signals between the remote 303 and CO1.

While the foregoing has described specific examples comprising a preferred embodiment of the invention including several alternatives, those skilled in the art, after having reviewed the application, will readily understand still other alternatives, also falling within the spirit and scope of the invention. While the application has specifically discussed wire-type telephony devices including telephones, facsimile machines and modems, other wire-type telephony devices may also employ the services of the invention. While a particular radio protocol employing 4 bidirectional channels has been illustrated, changing the number of channels employed is also within the spirit and scope of the present invention. Accordingly, the scope of the invention is to be construed, not by the specific examples described herein, but by the claims appended hereto.

We claim:

1. A wireless telephone subsystem for coupling line type telephony equipment to the Public Switched Telephone Network (PSTN) comprising:
   a) a base unit adapted to be coupled to a plurality of lines of the PSTN, said base unit including:
      a1) base coder/decoder means for transforming analog signals received from said lines of said PSTN to first digital signals and for transforming other digital signals to analog signals for coupling to said lines of said PSTN,
      a2) base multiple channel TDD/TDMA transceiver means coupled to said base coder/decoder means, said base multiple channel TDD/TDMA transceiver means responsive to said first digital signals for transmitting said signals by placing selected portions of said first digital signals into selected portions of a multiplex frame, and for receiving other digital signals and coupling said other digital signals to said base coder/decoder means, and
      a3) programmable switching means for associating selected of said PSTN lines and selected portions of said multiplex frame
   b) at least one wireless interface unit comprising:
      b1) coupling means for connecting to a line type telephony equipment,
      b2) remote coder/decoder means for transforming analog signals received from said line type telephony equipment over said coupling means to second digital signals and for transforming other digital signals to analog signals for coupling to said line type telephony equipment through said coupling means, and
      b3) remote TDD/TDMA transceiver means coupled to said remote coder/decoder means, said remote TDD/TDMA transceiver means responsive to said second digital signals for transmitting said second digital signals by placing said second digital signals into selected portions of said multiplex frame, and for receiving other digital signals for coupling said other digital signals to said remote coder/decoder means,
   whereby said line type telephony equipment is coupled to said PSTN without requiring a conductive path therebetween.

2. A wireless telephone subsystem as recited in claim 1 which further includes:
   c) at least one remote handset including:
      c1) a microphone and a speaker,
      c2) a remote handset coder/decoder means for transforming analog signals received from said microphone to fourth digital signals and for transforming other digital signals to analog signals for coupling to said speaker, and
      c3) a handset TDD/TDMA transceiver coupled to said handset coder/decoder means,
   whereby said microphone and speaker are coupled to said PSTN without requiring a conductive path therebetween.

3. A subsystem as is recited in claim 1 wherein said wireless interface unit is adapted to be connected to a modem.

4. A telephone subsystem as is recited in claim 1 wherein said wireless interface unit is adapted to be coupled to a facsimile machine.

5. A subsystem as recited in claim 1 which further includes:
   a4) a hybrid with two wire and four wire interfaces, said two wire interface coupled to said lines of said PSTN and said tour wire interface coupled to said base coder/decoder means.

6. A subsystem as recited in claim 1 wherein said coupling means of said wireless interface unit includes a hybrid with a two wire interface and a four wire interface, said two wire interface coupled to said line type telephone equipment and said/four wire interface coupled to said remote coder/decoder means.

7. A subsystem as recited in claim 6 which further includes:
   a4) a second hybrid with two wire and four wire interfaces, said second hybrid two wire interface coupled to one of said lines of said PSTN and said second hybrid four wire interface coupled to said base coder/decoder means.

8. A subsystem as recited in claim 3 wherein said coupling means provides a bidirectional path between said modem and said wireless interface unit.

9. A subsystem as recited in claim 8 wherein said coupling means includes a hybrid with a two wire interface and a four wire interface, said two wire interface coupled to said modem and said four wire interface coupled to said remote coder/decoder means.

10. A subsystem as recited in claim 8 wherein said coupling means includes
- b11) modem modulator/demodulator means with a two wire interface coupled to said modem and a four wire interface,
- b21) said remote coder/decoder means comprising forward acting error correcting encoder/decoder means, said four wire interface of said modem modulator/demodulator means coupled to said four wire interface of said forward acting error correcting encoder/decoder means.

11. A subsystem as recited in claim 10 wherein said base coder/decoder means includes:
- a11) forward acting error correcting encoder/decoder means coupled to said base multiple channel TDD/TDMA transceiver,
- a12) modem modulator/demodulator means with a two wire interface and a four wire interface, said four wire interface of said modem modulator/demodulator means coupled to said forward acting error correcting encoder/decoder means and said two wire interface coupled to line of said PSTN.

12. A subsystem as recited in claim 4 wherein said coupling means provides a bidirectional path between said facsimile machine and said wireless interface unit.

13. A subsystem as recited in claim 12 wherein said coupling means includes a hybrid with a two wire interface and a four wire interface, said two wire interface coupled to said facsimile machine and said four wire interface coupled to said remote coder/decoder means.

14. A subsystem as recited in claim 12 wherein said coupling means includes:
- b11) facsimile modulator/demodulator means with a two wire interface coupled to said facsimile machine and a four wire interface,
- b21) said remote coder/decoder means comprising forward acting error correcting encoder/decoder means, said four wire interface of said facsimile modulator/demodulator means coupled to said four wire interface of said forward acting error correcting encoder/decoder means.

15. A subsystem as recited in claim 14 wherein said base coder/decoder means includes:
- a11) forward acting error correcting encoder/decoder means coupled to said base multiple channel TDD/TDMA transceiver means,
- a12) facsimile modulator/demodulator means with a two wire interface and a four wire interface, said four wire interface of said facsimile modulator/demodulator means coupled to said forward acting error correcting encoder/decoder means and said two wire interface coupled to said a line of said PSTN.

16. A subsystem as recited in any of claims 1, 6, 8, 9, 10, 12, 13, or 14 wherein said coupling means includes ring generator means for generating ringing energy.

17. A wireless telephone subsystem for coupling line type telephony equipment to the Public Switched Telephone Network (PSTN) comprising:
- a) a base unit adapted to be coupled to a plurality of lines of the PSTN, said base unit including:
  - a1) base coder/decoder means for transforming analog signals received from said lines of said PSTN to first digital signals and for transforming other digital signals to analog signals for coupling to said lines of said PSTN,
  - a2) base multiple channel transceiver means coupled to said base coder/decoder means, said base multiple channel transceiver means responsive to said first digital signals for transmitting said signals by placing selected portions of said first digital signals into selected portions of a multiplex frame, and for receiving other digital signals and coupling said other digital signals to said base coder/decoder means, and
  - a3) programmable switching means for associating selected of said PSTN lines and selected portions of said multiplex frame
- b) at least one wireless interface unit comprising:
  - b1) coupling means for connecting to a line type telephony equipment,
  - b2) remote coder/decoder means for transforming analog signals received from said line type telephony equipment over said coupling means to second digital signals and for transforming other digital signals to analog signals for coupling to said line type telephony equipment through said coupling means, and
  - b3) remote transceiver means coupled to said remote coder/decoder means, said remote transceiver responsive to said second digital signals for transmitting said second digital signals by placing said second digital signals into selected portions of said multiplex frame, and for receiving other digital signals for coupling said other digital signals to said remote coder/decoder means, whereby said line type telephony equipment is coupled to said PSTN without requiring a conductive connection.

18. A wireless telephone subsystem as recited in claim 17 which further includes:
- c) at least one remote handset including:
  - c1) a microphone and a speaker,
  - c2) a remote handset coder/decoder means for transforming analog signals received from said microphone to fourth digital signals and for transforming other digital signals to analog signals for coupling to said speaker, and
  - c3) a handset transceiver coupled to said handset coder/decoder means, whereby said microphone and speaker are coupled to said PSTN without requiring a conductive connection.

19. A subsystem as is recited in claim 17 wherein said wireless interface unit is adapted to be connected to a modem.

20. A telephone subsystem as is recited in claim 17 wherein said wireless interface unit is adapted to be coupled to a facsimile machine.

21. A subsystem as recited in claim 17 which further includes:
- a4) a hybrid with two wire and four wire interfaces, said two wire interface coupled to said lines of said PSTN and said four wire interface coupled to said base coder/decoder means.

22. A subsystem as recited in claim 17 wherein said coupling means of said wireless interface unit includes a hybrid with a two wire interface and a four wire interface, said two wire interface coupled to said line type telephony equipment and said four wire interface coupled to said remote coder/decoder means.

23. A subsystem as recited in claim 22 which further includes:
- a4) a second hybrid with two wire and four wire interfaces, said second hybrid two wire interface coupled to one of said lines of said PSTN and said second hybrid four wire interface coupled to said base coder/decoder means.

24. A subsystem as recited in claim 19 wherein said coupling means provides a bidirectional path between said modem and said wireless interface unit.

25. A subsystem as recited in claim 24 wherein said coupling means includes a hybrid with a two wire interface and a four wire interface, said two wire interface coupled to said modem and said four wire interface coupled to said remote coder/decoder means.

26. A subsystem as recited in claim 24 wherein said coupling means includes:
- b11) modem modulator/demodulator means with a two wire interface coupled to said modem and a four wire interface,
- b21) said remote coder/decoder means comprising forward acting error correcting encoder/decoder means, said four wire interface of said modem modulator/demodulator means coupled to said four wire interface of said forward acting error correcting encoder/decoder means.

27. A subsystem as recited in claim 26 wherein said base coder/decoder means includes:
- a11) forward acting error correcting encoder/decoder means coupled to said base multiple channel transceiver,
- a12) modem modulator/demodulator means with a two wire interface and a four wire interface, said four wire interface of said modem modulator/demodulator means coupled to said forward acting error correcting encoder/decoder means and said two wire interface coupled to line of said PSTN.

28. A subsystem as recited in claim 20 wherein said coupling means provides a bidirectional path between said facsimile machine and said wireless interface unit.

29. A subsystem as recited in claim 28 wherein said coupling means includes a hybrid with a two wire interface and a four wire interface, said two wire interface coupled to said facsimile machine and said four wire interface coupled to said remote coder/decoder means.

30. A subsystem as recited in claim 28 wherein said coupling means includes:
- b11) facsimile modulator/demodulator means with a two wire interface coupled to said facsimile machine and a four wire interface,
- b21) said remote coder/decoder means comprising forward acting error correcting encoder/decoder means, said four wire interface of said facsimile modulator/demodulator means coupled to said four wire interface of said forward acting error correcting encoder/decoder means.

31. A subsystem as recited in claim 30 wherein said base coder/decoder means includes:
- a11) forward acting error correcting encoder/decoder means coupled to said base multiple channel transceiver,
- a12) facsimile modulator/demodulator means with a two wire interface and a four wire interface, said four wire interface of said facsimile modulator/demodulator means coupled to said forward acting error correcting encoder/decoder means and said two wire interface coupled to said a line of said PSTN.

32. A subsystem as recited in any of claims 17, 22, 24, 25, 26, 28, 29 or 30 wherein said coupling means includes ring generator means for generating ringing energy.

33. An interface subsystem interfacing line type telephone equipment to the Public Switched Telephone Network (PSTN) via a wireless communication system, said interface subsystem comprising:
- a) an interface unit with a two wire side and a four wire side, said two wire side adapted to be coupled to said line type telephone equipment, said interface unit including an energy source for supplying ring energy to said line type telephone equipment,
- b) coder/decoder means with two ports for converting digital information presented at a first port into analog form which is output at a second port and for converting analog information presented at said second port into digital information which is output at said first port, said two wire side of said interface coupled to said second port,
- c) transceiver means for transmitting digital information presented at an input and for receiving digital information and outputting said received digital information at an output, said input and output of said transceiver means coupled to first port of said coder/decoder means, and
- d) microprocessor means coupled to said energy source and responsive to said transceiver means for initiating operation of said energy source to supply ring energy to said line type telephone equipment.

34. The interface subsystem of claim 33 wherein said interface unit includes a two wire to four wire hybrid and said transceiver means comprises TDD/TDMA transceiver means.

35. The interface subsystem of claim 33 wherein said line type telephone equipment comprises a telephone.

36. The interface subsystem of claim 33 wherein said line type telephone equipment comprises a modem.

37. The interface subsystem of claim 33 wherein said line type telephone equipment comprises a facsimile machine.

* * * * *